Patented Dec. 20, 1938

2,140,745

UNITED STATES PATENT OFFICE 2,140,745

CELLULOSE DERIVATIVE COMPOSITION AND PROCESS FOR PREPARING SAME

Robert T. Hucks, South River, N. J., assignor to E. I. du Pont de Nemours & Company, Wilmington, Del., a corporation of Delaware No Drawing. Application July 22, 1936, Serial No. 91,965

15 Claims. (Cl. 134—79)

This invention relates to improved cellulose derivative coating compositions and processes for preparing same, and more particularly to a process for dispersing pigments in cellulose derivative vehicles, whereby desirable improvements in the properties of the compositions are secured.

Many of the pigments which are utilized in the manufacture of pigmented cellulose derivative enamels are chemically precipitated from water solutions of suitable chemical compounds. After precipitation the pigment is filtered, usually in a filter press, to provide a "press cake", technically known as pigment pulp, which ordinarily contains about 15–85% water and 85–15% pigment. The commercial pigments are then prepared by drying the "press cake" and mechanically grinding and sifting the dry material.

However, in the drying process many of the small pigment particles become cemented together, forming aggregates, which are difficultly broken up. The grinding and sifting operations accomplish this to a certain extent, but since the meshes of even the finest sieves are coarse compared with the size of the individual pigment particles as originally precipitated, it is impossible to obtain the pigment in as fine a state of subdivision as was the case before drying the pulp. Furthermore, the grinding and sifting operations cause the pigment particles to absorb a layer of air, which offers further difficulty when the pigment is subsequently dispersed in a paint, varnish or lacquer vehicle. In the drying process some pigments also undergo undesirable color changes.

The dry pigments prepared as described are ordinarily dispersed in the vehicle by grinding in suitable mechanical mills. While some of these mechanical devices, such as buhr stone mills, roller mills or ball mills function to break up most of the pigment aggregates and drive some of the air from the pigment particles, they do not develop the desired gloss in the final composition, and in addition, the color is deleteriously affected either from the metal particles which are abraded from the surfaces of the mechanical devices or from the excessive heat which may be generated during this operation. The drying, grinding, sifting and dispersion operations are expensive and entail the expenditure of considerable time in carrying out the process.

The present invention provides for a direct transfer of the pigment particles substantially in their original precipitated finely divided state suspended in water to the cellulose derivative vehicle without going through the intermediate steps of drying, grinding and sifting required in prior practices.

This invention therefore has as an object the provision of a process for transferring pigments to cellulose derivative vehicles directly from a water dispersion of the pigment. Another object is the provision of a process for dispersing pigments in cellulose derivative vehicles while retaining substantially the original precipitated pigment particle size. A further object of the invention is the provision of a process for dispersing pigments in cellulose derivative vehicles which affords a finish characterized by unusually high gloss and brilliancy of color. Another object is the provision of a process for dispersing pigments in cellulose derivative vehicles which affords desirable improvements in general durability for finishes prepared from these compositions, particularly where such finishes are exposed to the deteriorating effects of the elements. The invention has also as an object the provision of a process which insures greater safety in manufacturing pigmented cellulose nitrate coating compositions. A further and ancillary object is the provision of a pigmented cellulose nitrate intermediate which may be more safely shipped and stored prior to the admixing of other ingredients required to complete the final enamel. Other objects will become apparent as the description of the invention proceeds.

These objects are accomplished by mixing in a suitable manner, such as with a kneading machine, the water wet pigment pulp or press cake with a water wet cellulose derivative in the presence of a material which has preferential wetting properties for the pigment and which is preferably a non-solvent softener for the cellulose derivative and subsequently admixing a substantially non-volatile liquid which has a colloiding or gelatinizing effect on the cellulose derivative, and which is also water repellent; thereby causing the water to separate in such a manner that it can be readily removed.

A specific embodiment of the invention comprises kneading pigment pulp with water wet cellulose nitrate in the presence of a material, such as blown castor oil and a second high boiling liquid, such as dibutyl phthalate, which is water repellent and which colloids or gelatinizes the cellulose nitrate, at the same time causing a separation of the water in such a fashion as to permit the mechanical removal of the greater part of the separated water, as by decantation.

The following examples are given by way of illustration and no limitations are intended thereby, since modifications will readily occur to those skilled in the art without departing from the spirit and scope of the invention.

*Example 1.—Blue pigmented intermediate*

|  | Per cent |
|---|---|
| *Cellulose nitrate (water wet—25% water) | 31.00 |
| Chinese blue pigment pulp (80% water) | 43.20 |
| Small particle size zinc oxide (Kadox) | .99 |
| Blown castor oil | 5.05 |
| Dibutyl phthalate | 7.74 |
| Chinese blue pigment pulp (80% water) | 11.75 |
| Small particle size zinc oxide (Kadox) | .27 |
|  | 100.00 |

*The viscosity characteristic of the cellulose nitrate utilized in preparing this example is from 6 to 10 seconds as determined according to the procedure outlined in A. S. T. M. specifications D-301-33, Formula C.

The pigment pulp in the pigment-water ratio shown represents a product which is conveniently and commonly manufactured on a commercial scale.

Although the small particle size zinc oxide is preferred as indicated in this example, regular zinc oxide may be employed, but with some sacrifice in general efficiency of the operation. The particle size of "Kadox" lies very largely between 0.12 and 0.18 micron in diameter.

In preparing this intermediate, the first three ingredients i. e., the water wet cellulose nitrate, the pigment pulp and the small particle size zinc oxide are first charged into a suitable kneading device, such as a Werner and Pfleiderer mixer. The charge is kneaded for about five minutes after which the blown castor oil in the amount indicated is added and mixed for about 45 minutes. The charge may be heated from external sources to a temperature of about 60° C., although some temperature increase through frictional heat is developed during the kneading treatment. During this cycle, there is no substantial visible change in the physical condition of the mass, but it is probable that the pigment is transferred to the blown castor oil because of its preferential wetting properties for the pigment.

Dibutyl phthalate in the proportion indicated is then added and the kneading is continued for a period of from 5 minutes to 1 hour or until there is a definite separation of water. During this stage the charge undergoes a radical physical change in which the cellulose nitrate becomes colloided causing the formation of a mass consisting of cellulose nitrate, pigment, blown castor oil and dibutyl phthalate and expelling the water from which the pigment has now been removed. The greater part of this water may be removed by a convenient mechanical means, such as by decantation. After the water has been removed, the additional pigment pulp and zinc oxide are added and kneading is continued until water again separates. This water is decanted and the charge is then kneaded for about one hour, while maintaining a temperature of about 60° C., but not in excess of 70° C. Cooling of the mixer by external means may be necessary although it is preferred to maintain an elevated temperature of about 60–70° C. during this cycle of the process, since superior results are thus obtained. This additional kneading period is desirable in order to insure the maximum degree of dispersion in the cellulose nitrate vehicle.

The residual water which is merely held mechanically may be removed by simple evaporation such as by ordinary tray drying methods in which case it is desirable to sheet the charge first through loosely set steel rolls or by a vacuum drying process as more fully described hereinafter.

After this pigmented intermediate has been dried to preferably less than 3% of water, the final enamel may be manufactured by simply mixing the intermediate (after breaking into pieces) in an agitator mixer with other ingredients of the enamel such as solvents, diluents, resins, additional plasticizer and softener if required, etc. The pigmented intermediate is somewhat rubbery in character and non-sticky but is relatively soft and pliable and may readily be reduced to pieces of any desired size thus providing a very convenient material for handling, shipping or storing until it is desired to manufacture the final enamel.

The following example illustrates a composition prepared from the pigmented intermediate described in Example 1:

*Example 2.—High gloss blue enamel*

|  | Per cent |
|---|---|
| Pigmented intermediate of Example 1 | 31.32 |
| Alcohol (denatured) | 11.40 |
| Isobutyl acetate | 5.30 |
| Ethyl acetate | 15.50 |
| Isobutyl propionate | 7.80 |
| Ethyl acetate | 4.70 |
| Amyl alcohol | 9.00 |
| High solvency petroleum hydrocarbon | 3.33 |
| *Resin solution | 10.60 |
| Citric acid | .45 |
| Alcohol (denatured) | .60 |
|  | 100.00 |

*The resin solution utilized in this composition consists of a mixture of 80 parts of toluol and 70 parts of a synthetic resin which is a reaction product of:

|  | Per cent |
|---|---|
| Glycerine | 16.2 |
| Phthalic anhydride | 36.6 |
| Cocoanut oil | 47.2 |
|  | 100.0 | prepared according to methods already well known in the art.

The enamel is preferably prepared in accordance with the several steps indicated in the example although it is possible to carry out the mixing in one operation if desired.

Other solvents, diluents, and natural or synthetic resins may be conveniently utilized and in the same or somewhat different proportions from those shown. The citric acid dissolved in alcohol as indicated is added to prevent gelling of the enamel during storage.

*Example 3.—White pigmented intermediate*

|  | Per cent |
|---|---|
| Cellulose nitrate (water wet—25% water) | 32.23 |
| 5% Leaded zinc oxide | 35.53 |
| Water | 17.70 |
| Blown castor oil | 5.72 |
| Dibutyl phthalate | 8.82 |
|  | 100.00 |

The viscosity characteristic of the cellulose nitrate used in this composition is the same as that described for the cellulose nitrate in Example 1.

Example 3 illustrates the applicability of the present invention for pigments which are prepared other than by chemical precipitation in a water vehicle from which they are transferred direct to the cellulose nitrate colloid. In Example 3, the dry powdered leaded zinc oxide is charged into a kneading machine together with water wet cellulose nitrate and additional water in the proportions shown and the mixture kneaded for about 1½ hours.

Blown castor oil is added and the kneading is continued for about 1 hour after which the dibutyl phthalate is charged into the mixer. The charge is then kneaded until water separates as can be readily determined by visual observation. As in Example 1, the cellulose nitrate colloids during this stage, expelling the water and leaving it as a distinct and separate phase. The greater part of this separated water may be drawn off by any convenient mechanical means.

Kneading is then continued for about 2 hours while maintaining a temperature of about 60–70° C. and not substantially in excess of 75° C. Usually the frictional heat developed through continued kneading of the charge which has assumed a relatively high consistency suffices, but the desired range may be conveniently controlled by heating and cooling means provided in the kneading machine. The remaining residual water which is merely physically entrapped in the pigmented colloid is removed according to the methods described for Example 1 and more fully described hereinafter.

The substantially dry, that is non-sticky, intermediate which is thus obtained may be made up into a finished enamel in accordance with the general procedure outlined for Example 2.

*Example 4.—Maroon pigmented intermediate*

|  | Per cent |
|---|---|
| Cellulose nitrate (water wet—25% water) | 24.73 |
| Maroon pigment pulp (85% water) | 64.17 |
| Blown castor oil | 4.38 |
| Dibutyl phthalate | 6.72 |
|  | 100.00 |

As in the case of Examples 1 and 3, the cellulose nitrate utilized in this composition is the commercial low viscosity type. The water wet cellulose nitrate as obtained in the manufacture of commercial cellulose nitrate in the stage prior to the conventional dehydration with alcohol and while still uncolloided is mixed in a kneading machine with maroon pigment pulp (representing an intermediate stage in the manufacture of chemically precipitated pigments) and blown castor oil for about ½ hour to provide a uniform mixture of these ingredients. Dibutyl phthalate in the proportion indicated is added and the charge is then kneaded until complete separation of the water takes place and the pigment is taken up by the cellulose nitrate, which becomes colloided through the action of the dibutyl phthalate.

The end point of this stage is readily discernible by direct observation. The separated water which is substantially clear and devoid of pigment particles may then be decanted from the mixer or drawn off by any other suitable means. Kneading is continued after removal of the greater portion of the separated water for a period of about one hour while maintaining the charge at a temperature of not over 70° C. and preferably not less than 60° C. in order to provide maximum efficiency in the operation of the process. The residual water which is physically entrapped in the pigmented intermediate to the extent of between 10 and 25% is then removed by suitable means such as ordinary tray drying preceded by sheeting the batch through loosely set steel rolls to a thickness of about .05 inch, or through the use of reduced pressure as applied to the last kneading cycle, as described more fully hereinafter.

*Example 5.—Yellow pigmented intermediate*

|  | Per cent |
|---|---|
| Cellulose nitrate (water wet—25% water) | 25.30 |
| Yellow lead chromate pigment pulp (58% water) | 62.60 |
| Blown castor oil | 4.37 |
| Dibutyl phthalate | 7.73 |
|  | 100.00 |

As in the previous examples, the cellulose nitrate in this composition is the commercial low viscosity type selected primarily because of its more general utilization in the finishing industry. The cellulose nitrate, yellow pigment pulp and blown castor oil are charged into a kneading machine and mixed about ½ hour while increasing the temperature to about 55–60° C. Dibutyl phthalate is added in the proportion shown and kneading continued. Water which usually separates in less than 5 minutes may be conveniently decanted or otherwise removed from the mixer. The remaining mixture is then kneaded for about 1 hour after which any residual water that cannot be readily eliminated by decantation is removed either by sheeting the charge through loosely set steel rolls, breaking the sheets up into small pieces and drying at about 50–60° C. by conventional tray drying methods or by the application of diminished pressures during the last stages of the final kneading cycle.

*Example 6.—Orange pigmented intermediate*

|  | Per cent |
|---|---|
| Cellulose nitrate-low viscosity (23% water) | 18.0 |
| Orange lead chromate pigment pulp (20% water) | 71.6 |
| Blown castor oil | 4.34 |
| Dibutyl phthalate | 6.00 |
|  | 100.00 |

The cellulose nitrate, orange pigment pulp and blown castor oil are charged into a kneading machine and mixed for about ½ hour while increasing the temperature to about 55–60° C. Dibutyl phthalate is then added and kneading continued. Water which usually separates in less than 5 minutes is removed by decantation. The remaining mixture is then kneaded for a period of about one hour after which any residual water that is not removed by decantation may be eliminated by tray drying methods or by the application of diminished pressures referred to in previous examples and more fully described hereinafter. This example illustrates particularly the adaptability of the process for a water dispersion of a pigment where the pigment is present in relatively high proportions.

Example 7.—Black pigmented intermediate

|  | Per cent |
|---|---|
| Cellulose nitrate (25% water) | 41.58 |
| Carbon black pigment | 9.34 |
| Oil soluble nigrosine (30% solvent naphtha) | 3.33 |
| Water | 26.17 |
| Blown castor oil | 6.70 |
| Dibutyl phthalate | 12.88 |
|  | 100.00 |

The cellulose nitrate, carbon black, nigrosine and water are charged into a kneading machine and mixed for about ½ hour. Blown castor oil is added and kneading continued for about ½ hour after which dibutyl phthalate in the proportion shown is incorporated by further kneading. At this stage, the water forms a separate phase and is removed by decantation. Kneading is continued for about one hour in order to provide maximum degree of dispersion of the pigment in the cellulose nitrate vehicle. The residual water which is not removed by decantation may be removed either by simple evaporation such as afforded by conventional tray drying methods, in which case it is desirable to first sheet the charge through loosely set steel rolls followed by breaking the sheets into pieces or the residual water may be eliminated by suitable vacuum drying processes.

This example is illustrative of the process as applied to a pigment which is not manufactured by chemical precipitation processes. The enamel composition prepared from this intermediate is characterized by unusual jetness and gloss as compared to compositions manufactured according to conventional methods heretofore practiced.

If tray drying methods are used in removing the residual water from the pigmented intermediate it has been found desirable, in order to place the intermediate in such physical form that will permit more rapid evaporation of the water to sheet the intermediate after cooling to about 40° C. through a suitable roller mill to a thickness of about .05 inch, after the charge has been removed from the kneading machine. This sheeted material may then be broken up into small pieces, placed on suitable trays and dried at about 65° C. for a time period sufficient to reduce the water content to 3% or less.

However, principally from the economic standpoint, it has been found expedient to remove the residual water by means of reduced pressures. This may be conveniently accomplished by the use of a vacuum type kneading machine, which of course may serve also for the earlier stages of the process. In practicing this process, after the greater part of the separated water has been decanted from the mixer, the charge is subjected to reduced pressures of about 23 to 29 inches of mercury with continued kneading, while maintaining a temperature of not more than 75° C. and preferably between 55° and 65° C. The water content of the intermediate may be readily reduced to 3% or less by this method.

In some instances there is a tendency for the charge to increase in consistency during the vacuum treatment to such an extent as to make continued kneading difficult and in addition there is a tendency for the frictional temperature to develop to a point which approaches the ignition temperature of the intermediate. It has therefore been found expedient in some cases to add in small portions, a suitable "water-carrier" such as gasoline, toluene, butyl alcohol, butyl acetate, etc., to facilitate removal of the water and to maintain a more desirable consistency in the charge during the final kneading under reduced pressures while removing the residual water. This modification may be made "continuous" in the sense that the binary which is distilled off is collected, separated, and the separated "carrier" returned to the charge continuously until the desired reduction in residual water has been obtained. It is possible to add a portion of the water carrier with the dibutyl phthalate during the second stage of the process but it is preferred to add the carrier after the major portion of the separated water has been decanted and just prior to the vacuum treatment.

Final water contents in the intermediate of as low as 0.3% have been obtained by this method, although a water content of about 1% is commercially acceptable and this figure represents the usual end-point of the process. The amount of water carrier required may be determined according to the amount of water retained in the charge after the decantation step. Ordinarily to remove one pound of water, 3 to 5 pounds of gasoline are required.

A variation of the preferred procedure of the process, which has also been successfully employed in preparing the improved enamels, involves a preliminary treatment of the pigments in a water dispersion with a suitable oil and cellulose nitrate plasticizer, by mixing these ingredients in a mixing device, such as an agitator mixer. This mixture is then filtered to remove a substantial proportion of the water vehicle. The filtrate from this operation is substantially free of pigment. The filter press-cake is then kneaded with water wet cellulose nitrate. From this point, the modification parallels the operating procedure indicated for Example 1. The particular advantage offered in this variation resides in the more accurate control of the water content of the pigment-water dispersion. In some instances there appears to be also a more rapid separation of the water during the latter stages of the process.

In place of the blown castor oil shown in the examples, other blown non-drying vegetable oils, such as blown cottonseed, blown cocoanut, etc., may be used. The raw nondrying vegetable oils may also be employed in the process of the invention but they do not seem to be as suitable as the corresponding blown oils. The drying oils such as raw linseed oil do not perform in the desired manner in the present process and the hydrogenated oils are even less effective. However, blown linseed oil seems to exhibit some of the desired properties, but not to the extent which characterizes the blown non-drying oils, which are preferred. Although the blown non-drying vegetable oils are preferably employed in the first stage of the process, it has been demonstrated that the process may be carried out utilizing certain water immiscible alcohols, such as cyclohexanol, in place of the oil.

In place of the dibutyl phthalate shown in the examples other commercially available cellulose derivative solvent plasticizers may be used. Cyclohexyl butyl phthalate was found to be particularly effective in employing the process for dispersing iron blue pigments. Dimethyl and diethyl phthalates and tricresyl phosphate while not preferred for operating the process with iron blue pigments are satisfactory with other types of pigments.

The "Cellosolve" phthalates (phthalate esters of methyl, ethyl and butyl ethers of ethylene glycol) are also suited for use in the latter stage of the process in the manufacture of the pigmented intermediate. The essential requirements for the agent as used at this point in the process are that it have sufficient solvent power to colloid the nitrocellulose, be water repellent and relatively non-volatile and cause a definite and substantially complete separation of the water.

It is also possible to substitute certain synthetic resin compositions for the dibutyl phthalate generally employed in the latter stages of the process. For example, it has been found that the cocoanut oil modified alkyd resin described in Example 2 may be substituted for the dibutyl phthalate, in which case the plasticizer is added in the final mixing in making up the ultimate enamel composition. The cocoanut oil modified alkyd resin in Example 2 is characterized by its relatively soft and plastic physical condition at normal temperatures and by its apparent swelling or solvent action on the cellulose nitrate.

Thus to function as a substitute for the plasticizer in preparing the pigmented intermediate, any synthetic resin may be used, which is compatible with cellulose nitrate and which has satisfactory film properties. In addition it must be water repellent and be sufficiently plastic at least at the elevated temperatures utilized in the preferred form of the invention to permit suitable kneading and finally it must have comparable swelling and solvent action on the cellulose nitrate to effect a colloiding action thereon and cause a separation of the water. This modification has demonstrated its utility particularly in the preparation of maroon enamels.

The cellulose nitrate employed in the examples, illustrating the invention, is of the low viscosity or ½ second type. However, certain cellulose nitrates of higher viscosity characteristics are likewise operable in the present invention. Any form of cellulose nitrate may be employed in preparing the compositions of the invention including nitrated regenerated cellulose, nitrated cotton linters, nitrated wood pulp, suitably processed smokeless powder, etc.

The operating cycles indicated in the examples represent optimum conditions. Longer kneading treatments may be employed but in the interests of operating economy it is obviously desirable to maintain as short a cycle as possible, the extent of which is governed entirely by the completeness of the water separation and the quality of the final product as controlled by the proper dispersion of the pigment. As already indicated, elevated temperatures not to exceed 75° C. are desirable in increasing the general efficiency of the process but it is also possible to operate between this temperature and normal room temperatures. Lower operating temperatures have a distinct tendency to reduce general operating efficiency.

The ratio of pigment to water in the original pigment-water dispersion is a fairly critical factor in the operation of the process. A pigment content of between 16 and 23% in the water dispersion, particularly in the case of the iron blues, represents the preferred ratio, since optimum results are usually obtained under these conditions. However, more concentrated slurries, up to about 80% pigment content have been satisfactorily processed according to the invention.

Substantially lower concentrations than the preferred range indicated above give rise to difficulties in effecting separation of water in the latter stages of the process.

A modification of the basic process described above, comprehends the use of certain agents which may for convenience be designated auxiliary transfer agents. These agents appear to assist materially in operating the process to greatest advantage, particularly as regards reducing the time cycle required for effecting separation of water in the latter stage of the process. In Example 1, it will be noted that a small proportion of colloidal zinc oxide is included. This material seems to function in two ways; in the first place, a more desirable color is secured, an effect which is described in detail in copending application S. N. 656,153, filed February 10, 1933, and in the second place it functions in a manner that effects quick separation of water. It has been discovered also that certain so-called dispersing agents likewise serve to speed the separation of water and may therefore be used as substitutes for the zinc oxide with many pigments in conjunction with the water wet cellulose nitrate and oil in the first stage of the process or they may be employed jointly with a small amount of zinc oxide in working the process, particularly in the case of iron blue pigments.

Of the large number of these auxiliary agents tested, soya lecithin, cocoanut oil fatty acids, triethanolamine, lauryl methyl glucamine, stearyl tri-methyl ammonium bromide, cetyl pyridinium bromide, and the transfer agents disclosed in the application of Sloan and Patterson, S. N. 91,967 filed on even date herewith have been found to be outstanding in effecting accelerated separation of the water. These compounds are referred to as auxiliary transfer agents.

The process is also applicable to the preparation of other cellulose derivative pigmented intermediates, based on cellulose acetate or cellulose ethers such as ethyl cellulose. Obviously it is necessary in each specific instance to employ the proper compatible oils and solvent plasticizers in the several steps of the process. The choice of the proper materials for adapting the process for use with these cellulose derivatives is considered to be within the ordinary practice of one skilled in the art.

The process of the invention may be conveniently utilized with any of the commercially available pigments manufactured by chemical precipitation in water.

The following illustrate some of the pigments of this type for which the process is operable: lead chromate yellows, chrome oranges, iron ferrocyanide blues such as, Prussian, Milori, and Chinese blue, toners like para, maroon, toluidine, etc.; chrome greens, and red, maroon, black, etc. lakes.

Pigments which are not ordinarily manufactured by chemical precipitation methods may be preliminarily dispersed in water by some mechanical means such as by a short grinding cycle in a ball mill after which they may be processed according to the procedure of the present invention. As specific examples of this class of pigments may be mentioned, bone black, iron oxide, burnt umbre, ochre, etc. Certain other pigments also not ordinarily manufactured by chemical precipitation methods such as lithopone and other sulfide pigments, ultramarine blue, titanium pigments such as titanium oxide, zinc oxide, barium, lead and zinc titanates, antimony oxide, carbon black, etc., may be utilized in the process of the invention without a preliminary grinding in a water suspension but may be incorporated directly as illustrated in Examples 3 and 7.

The improved process is generally useful for the dispersion of pigments in cellulose derivative coating compositions, whereby numerous outstanding improvements are effected.

The process also affords a pigmented intermediate, which as such, presents several advantages not heretofore generally available in the industry.

In operating the process of the invention, fire and explosion hazards are reduced to a minimum, since as indicated, the major part of the process is carried out in the presence of appreciable quantities of water. Since the pigmented intermediate contains cellulose nitrate in a well colloided condition and substantial amounts of such inert materials as dibutyl phthalate and blown castor oil, a favorable safety factor also prevails for the product itself. Obvious advantages are apparent in handling shipping and storing this intermediate which also permits the manufacture of the final enamel through ordinary mixing procedures with the commonly available agitator type mixers. The process is characterized by considerable operating economies, in view of the substantial savings in time in developing the dispersion of the pigment in the desired vehicle, the relatively low power costs as compared to processes heretofore generally practiced and avoidance of losses in materials frequently encountered in prior practices.

It will be noted particularly that the steps of filtering, drying and dry grinding of pigments manufactured by chemical precipitation processes and generally practiced heretofore are eliminated in the new process. The elimination of these steps also effects improvement in quality in the final enamel, since in the transfer of the pigment direct from the water dispersion to the enamel intermediate, the formation of pigment aggregates, which are difficultly reduced by conventional grinding methods, is avoided, thus providing an enamel containing little or no "pigment grit".

In the use of water wet cellulose nitrate as permitted in the process of the invention, the requirement in prior conventional methods that the cellulose be dehydrated with alcohol or similar agent prior to its use in manufacturing plastic and coating compositions is avoided, thus providing further operating economies.

The enamels prepared from the pigmented intermediate are characterized by greater brilliance and color depth and are cleaner in color with appreciable higher gloss or lustre than is generally secured in enamels manufactured according to prior art methods. In the case of compositions containing certain pigments which have a tendency to chalk on exposure, definite improvements in this undesirable property are also noted. The process also provides improvements in general durability of enamels which are subjected to outdoor exposure such as would be encountered in automobile finishes.

As many widely different variations of the invention may be made in the invention without departing from the spirit and scope thereof, it is to be understood that the invention is not limited to the specific embodiments hereinbefore set forth, except as defined in the appended claims.

I claim:

1. Process for incorporating pigments in cellulose nitrate coating compositions comprising mixing a water dispersion of a pigment with a compound selected from the group consisting of blown non-drying vegetable oils, water immiscible aromatic alcohols, and cyclohexanol, and an uncolloided water wet cellulose nitrate, until uniform and without substantial change in the physical condition of the mass adding a non-volatile liquid, water repellent, cellulose nitrate colloiding agent and continuing mixing until the cellulose derivative is colloided and the water separates removing the separated water, kneading for about one hour and removing the separated residual water in excess of about 3%, and adding solvents, diluents and resin modifiers to form the final enamel.

2. Process for incorporating pigments in a finely divided state in cellulose nitrate compositions, comprising kneading a water dispersion of a pigment with a blown non-drying vegetable oil and an uncolloided water wet cellulose nitrate, until uniform and without substantial change in the physical condition of the mass adding thereto a cellulose nitrate solvent plasticizer, and continuing kneading until water separates and the cellulose nitrate becomes colloided, reducing the separated water content to from 10–25% by decantation, kneading for about one hour and removing the residual water until a final water content of less than 3% is obtained.

3. Process of claim 2 in which the blown non-drying vegetable oil is blown castor oil.

4. Process of claim 2 in which the solvent plasticizer for the cellulose nitrate is dibutyl phthalate.

5. Process for incorporating pigments in cellulose derivative compositions in which a chemically precipitated pigment is transferred directly from a water dispersion to the cellulose derivative vehicle, thereby maintaining substantially its original finely divided state, comprising kneading the water dispersion of the pigment with a non-volatile, water immiscible, liquid organic material having preferential wetting properties for the pigment said liquid organic material being compatible with and having substantially no colloiding properties for the cellulose derivative and an uncolloided water wet cellulose derivative, until uniform and without substantial change in the physical condition of the mass adding thereto a non-volatile, liquid, water repellent compound having specific solvent action on the cellulose derivative and kneading until the cellulose derivative is colloided with simultaneous separation of the water, removing the major portion of the separated water, kneading for about one hour and removing the residual water in excess of about 8%.

6. Process for incorporating pigments in a finely divided state in cellulose derivative compositions comprising mixing a water dispersion of a pigment, a non-volatile, water immiscible, organic liquid material having preferential wetting properties for the pigment said liquid organic material being compatible with and having substantially no colloiding effect on the cellulose derivative and an auxiliary transfer agent with an uncolloided water wet cellulose derivative, until uniform and without substantial change in the physical condition of the mass mixing therewith a substantially non-volatile, liquid, water repellent cellulose derivative colloiding agent until the cellulose derivative is colloided, simultaneously separating the water, removing the separated water, kneading for about one hour and removing the residual water until the final water content is below 3%.

7. Process of claim 6 in which the auxiliary transfer agent is selected from the group consisting of soya lecithin, cocoanut oil fatty acids, triethanol amine, lauryl methyl glucamine, stearyl tri-methyl ammonium bromide and cetyl pyridinium bromide.

8. Process of claim 6 in which the pigment in the water dispersion is an iron blue pigment.

9. Process for incorporating pigments in a finely divided state in cellulose nitrate compositions, comprising kneading a water dispersion of a pigment with a blown non-drying vegetable oil and an uncolloided water wet cellulose nitrate while increasing the temperature to 60-75° C., until a uniform mixture is obtained without substantial change in the condition of the mass adding thereto a solvent plasticizer for the cellulose nitrate and continuing kneading while maintaining a temperature of 60-75° C. until water separates, removing the separated water, kneading for about one hour and removing the separated residual water in excess of about 3%.

10. Process of claim 9 in which the initial water dispersion of a pigment consists of a pigment chemically precipitated in a water vehicle.

11. Process of claim 9 in which the pigment content of the initial water dispersion is between 13 and 80% by weight.

12. Process for incorporating pigments in a finely divided state in cellulose nitrate compositions, which comprises kneading a water dispersion of a pigment consisting of from 13 to 80% by weight of pigment with blown castor oil and uncolloided water wet cellulose nitrate for about 45 minutes while increasing the temperature to 60-75° C., adding thereto dibutyl phthalate and continuing kneading for about one hour until the cellulose nitrate is colloided and water separates, removing the separated water and kneading for about one hour and removing the residual water under sub-atmospheric pressure until less than 3% water is present.

13. Process for incorporating pigments in cellulose nitrate compositions in a finely divided state comprising kneading a water dispersion of a pigment containing from 13 to 80% by weight of pigment with an uncolloided water wet cellulose nitrate containing about 75% of cellulose nitrate and blown castor oil in the ratio of 10 parts of cellulose nitrate, from about 5 to 40 parts of pigment and from about 1.2 to 3 parts of blown castor oil for about one hour while maintaining the temperature between 55-65° C., until uniform and without substantial change in the physical condition of the mass adding thereto from about 1.8 to 4.3 parts of dibutyl phthalate and continuing kneading until the cellulose nitrate is colloided and water separates, removing the separated water, kneading for about one hour and removing the separated residual water in excess of about 3%.

14. Process for incorporating iron blue pigments in cellulose nitrate compositions comprising kneading about 43 parts of a water dispersion of an iron blue pigment containing about 20% by weight of pigment and a small amount of zinc oxide with 31 parts of uncolloided water wet cellulose nitrate containing about 75 parts of cellulose nitrate and 5 parts of blown castor oil for about 45 minutes while increasing the temperature to 55-65° C., until uniform and without substantial change in the mass adding thereto about 8 parts of dibutyl phthalate, kneading for about one hour until the cellulose nitrate is colloided and water separates, removing the separated water, adding about 12 parts of a water dispersion of an iron blue pigment containing about 20% by weight of pigment and a small amount of zinc oxide with continued kneading until further water separates and removing the separated water until the final water content is below 3%.

15. The process of preparing cellulose derivative compositions which consists in the improvement of first preparing an intermediate by mixing a water-wet cellulose derivative and a water-wet pigment with an organic liquid which is a non-solvent for the cellulose derivative and has preferential wetting power over water for wetting the pigment and which is compatible with the finished coating composition, continuing the mixing until the mass is uniform and without substantial change in its physical condition, and thereafter colloiding the cellulose derivative by mixing therewith a substantially non-volatile water-repellent liquid cellulose derivative colloiding agent, and removing all of the water in the mass in excess of about 3% before mixing volatile solvents therewith.

ROBERT T. HUCKS.